United States Patent
Lin (10) Patent No.: US 7,586,867 B2
(45) Date of Patent: Sep. 8, 2009

(54) ACCESS POINT AND METHOD FOR ESTABLISHING A WIRELESS DISTRIBUTION SYSTEM LINK BETWEEN ACCESS POINTS

(75) Inventor: Wen-Kuang Lin, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 195 days.

(21) Appl. No.: 11/308,593

(22) Filed: Apr. 10, 2006

(65) Prior Publication Data

US 2007/0115901 A1 May 24, 2007

(30) Foreign Application Priority Data

Nov. 24, 2005 (CN) .................... 2005 1 0101753

(51) Int. Cl.
*H04W 4/00* (2009.01)
*H04B 7/00* (2006.01)
*H04J 3/24* (2006.01)

(52) U.S. Cl. .................. 370/321; 370/338; 370/310; 370/349

(58) Field of Classification Search ............... 455/11.1, 455/39, 41.2; 370/338, 342
See application file for complete search history.

(56) References Cited

U.S. PATENT DOCUMENTS 6,940,033 B1    9/2005  Jones, Jr. et al.
2002/0126000 A1* 9/2002 Shintani et al.
2004/0039950 A1* 2/2004 Okamoto et al. ............ 713/300
2004/0054774 A1* 3/2004 Barber et al. ................ 709/224
2004/0103278 A1* 5/2004 Abhishek et al. ............ 713/160
2004/0141617 A1   7/2004 Volpano
2005/0014467 A1* 1/2005 Ishiwata et al. ............... 455/39
2006/0034235 A1* 2/2006 Yamane ...................... 370/338

FOREIGN PATENT DOCUMENTS

| CA | 2575584 A1 | 9/2005 |
| GB | 2409379 A | 6/2005 |
| TW | 280065 | 7/1996 |
| TW | 372384 | 10/1999 |
| TW | 506161 | 10/2002 |

* cited by examiner

*Primary Examiner*—Nick Corsaro
*Assistant Examiner*—Amanuel Lebassi
(74) *Attorney, Agent, or Firm*—Wei Te Chung (57) ABSTRACT

A method for a establishing wireless distribution system link between two access points includes the steps of: providing an input module for each access point; receiving a first input to enter a master mode by an input module of a first access point, and transmitting a broadcast frame by the first access point; receiving a second input to enter a slave mode by an input module of a second access point, and scanning the broadcast frame by the second access point; transmitting a request frame from the second access point to the first access point; and transmitting an acknowledgement frame from the first access point to the second access point. An access point relating to the method is also provided.

13 Claims, 6 Drawing Sheets

ACCESS POINT AND METHOD FOR ESTABLISHING A WIRELESS DISTRIBUTION SYSTEM LINK BETWEEN ACCESS POINTS

FIELD OF THE INVENTION

The invention relates to access points, and particularly to an access point and a method for establishing a wireless distribution system (WDS) link between two access points.

DESCRIPTION OF RELATED ART

In an Institute of Electrical and Electronics Engineers (IEEE) 802.11 wireless network, a wireless distribution system (WDS) is used for transferring data between access points (APs). In a conventional method, a service set identifier (SSID) or a basic service set identifier (BSSID) of one access point must be set in another access point by users manually via a user interface (UI) in order to establish a WDS link between the two access points. However, the manual setting is difficult for many users to perform, and commonly only suitably qualified users are able to complete the task successfully.

Overall, it can be very difficult for common users to set up the SSID or BSSID via the conventional user interface. Moreover, some users do not even know how to set up the SSID and BSSID at all.

SUMMARY OF INVENTION

An exemplary embodiment of the present invention provides an access point for establishing one or more wireless distribution system (WDS) links with one or more access points. The access point includes an input module and a main module. The input module receives an input and initiates a WDS link. The main module detects the input, determines an operating mode according to the input, and transmits and receives frames for establishing the WDS link according to the operating mode.

Another exemplary embodiment of the present invention provides a method for establishing a WDS link between two access points. The method includes the steps of: providing an input module for each access point; receiving a first input to enter a master mode by an input module of a first access point, and transmitting a broadcast frame by the first access point; receiving a second input to enter a slave mode by an input module of a second access point, and scanning the broadcast frame by the second access point; transmitting a request frame from the second access point to the first access point; and transmitting an acknowledgement frame from the first access point to the second access point.

By employing the above-described access point and method, it can be easy to establish WDS links between access points by use of the input modules, automatically setting up a basic service set identifier (BSSID).

Other advantages and novel features will become more apparent from the following detailed description when taken in conjunction with the accompanying drawings, in which:

DETAILED DESCRIPTION

Figure 1:
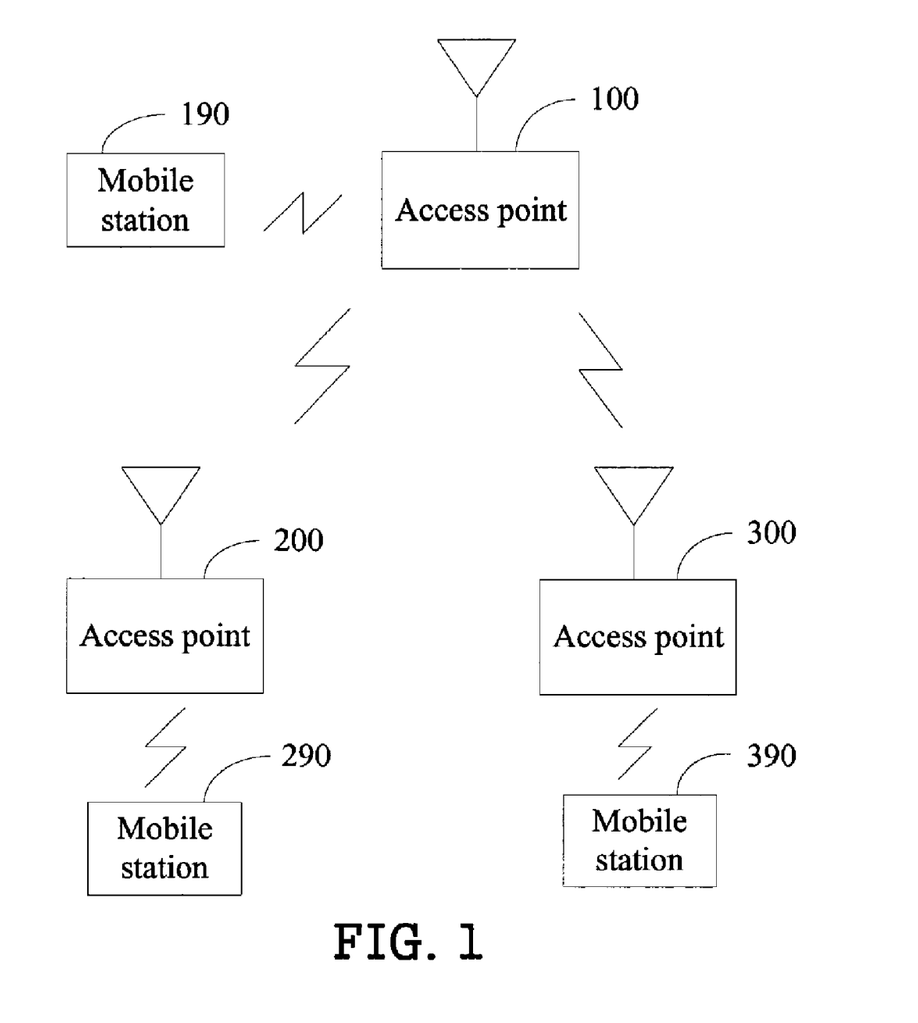
FIG. 1 is a schematic diagram of an exemplary wireless communication system including three access points, any one or more of which may be one in accordance with an exemplary embodiment of the present invention.

FIG. 1 is a schematic diagram of an exemplary wireless communication system including three access points, any one or more of which may be one in accordance with an exemplary embodiment of the present invention. The wireless communication system includes a plurality of access points (APs) 100, 200, and 300 (i.e., only three of many possible shown) and a plurality of mobile stations 190, 290, and 390 (i.e., only three of many possible shown). The mobile stations 190, 290, 390 are devices that can be connected to a wireless network, such as notebook computers, mobile telephones, personal digital assistants (PDAs), and the like. The mobile stations 190, 290, 390 communicate with the access points 100, 200, 300 respectively.

The access point 100 can communicate with the access point 200 by establishing a wireless distribution system (WDS) link therewith, and thus the mobile station 190 can communicate with the mobile station 290 via the access point 100 and the access point 200. Therefore, the scope of the wireless network is expanded.

Similarly, the access point 100 and the access point 300 can establish a WDS link therebetween, whereby the scope of the wireless network is further expanded.

Figure 2:
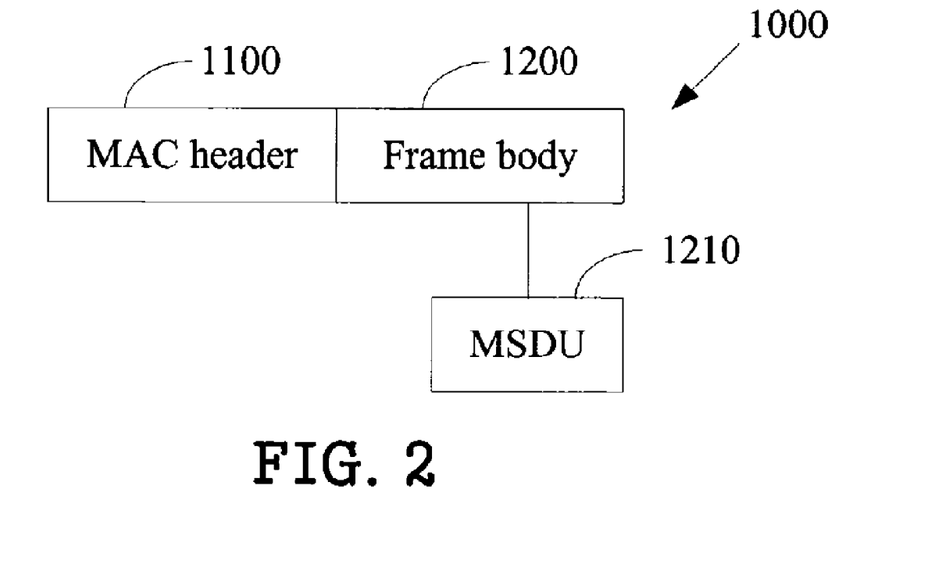
FIG. 2 is a schematic diagram of a data frame for establishing WDS links predefined by any one or more of the access points of FIG. 1, according to an exemplary embodiment of the present invention.

FIG. 2 is a schematic diagram of a data frame 1000 for establishing WDS links predefined by any one or more of the access points of FIG. 1, according to an exemplary embodiment of the present invention. The data frame 1000 includes a media access control (MAC) header 1100 and a frame body 1200. The frame body 1200 includes a MAC service data unit (MSDU) 1210.

In the exemplary embodiment, each data frame 1000 may be a broadcast frame, a request frame, or an acknowledgement (ACK) frame, according to the function performed by the data frame 1000. The broadcast frame includes a broadcast MSDU. The broadcast MSDU includes a basic service set identifier (BSSID), a channel number (channel No.), and a current WDS link number. The BSSID is a MAC address of an access point that transmits the broadcast frame. The channel number is of an existing channel of the access point transmitting the broadcast frame. The current WDS link number is established by the access point transmitting the broadcast frame. In other embodiments, the broadcast MSDU may include more information according to different requirements.

The request frame includes a request MSDU. The request MSDU includes a BSSID and a WDS link number. The BSSID is a MAC address from which the request frame was transmitted. The WDS link number is established by the access point transmitting the request frame. In other embodiments, the request MSDU may include more information according to different requirements. The ACK frame includes an ACK MSDU 1210 having information for establishing WDS links.

In other embodiments, a further data frame 1000 may be a query frame. The query frame may include a query MSDU having information for establishing WDS links.

Figure 3:
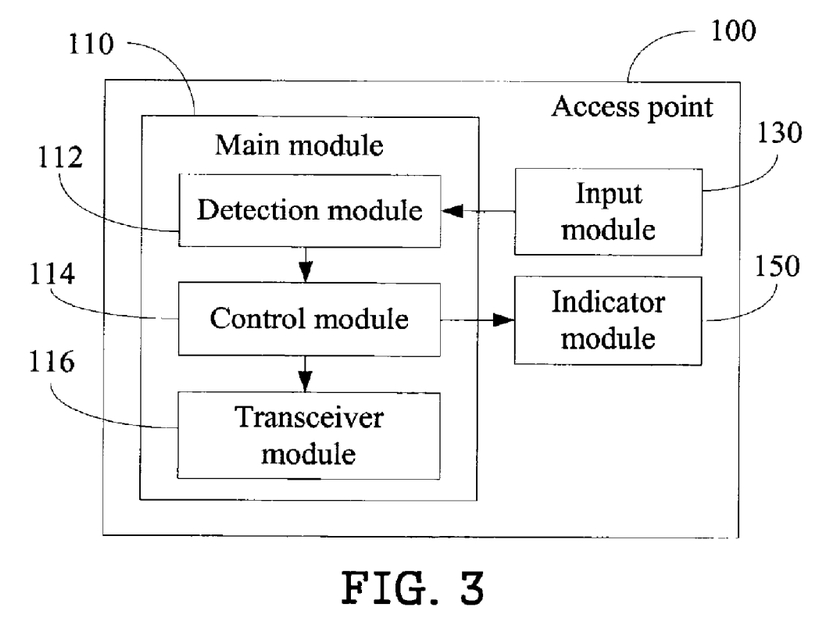
FIG. 3 is a block diagram of functional modules of one of the access points of FIG. 1, the access point being in accordance with an exemplary embodiment of the present invention.

FIG. 3 is a block diagram of functional modules of the access point 100, the access point 100 being in accordance with an exemplary embodiment of the present invention. In the exemplary embodiment, the access point 100 includes a main module 110, an input module 130, and an indicator module 150. The input module 130 receives an input and initiates a WDS link. The indicator module 150 indicates a WDS link status. In the exemplary embodiment, the input module 130 includes a button, and the indicator module 150 includes a light emitting diode (LED). In other embodiments, the input module 130 may include any of other kinds of input devices, and the indicator module 150 may include any of other kinds of display devices and/or any of various kinds of audio devices and/or other indicative devices or means. In still other embodiments, the indicator module 150 may be omitted from the access point 100.

The main module 110 detects the input, determines an operating mode according to the input, and transmits and receives data frames 1000 for establishing the WDS link according to the operating mode. In the exemplary embodiment, the data frames 1000 for establishing the WDS link include a broadcast frame, a request frame, and an ACK frame. In other embodiments, the data frames 1000 for establishing the WDS link may further include a query frame. The main module 110 is further used for controlling the indication status of the indicator module 150 according to the operating mode.

The main module 110 includes a detection module 112, a control module 114, and a transceiver module 116. The detection module 112 detects the input received by the input module 130, and transmits a result of the detection to the control module 114. In the exemplary embodiment, the input includes a measurement of how long the button of the input module 130 is pressed.

The control module 114 determines the operating mode of the access point 100 according to the data received from the detection module 112, and controls the indication status of the indicator module 150 according to the operating mode. In the exemplary embodiment, if the button of the input module 130 is pressed longer than a predetermined time period, the control module 114 controls the access point 100 to enter a master mode, and the indicator module 150 produces a first indication for indicating that the access point 100 has entered the master mode. In the exemplary embodiment, the predetermined time period can be approximately 3 seconds. It is to be noted that the description herein is not restricted to any particular predetermined time period. The first indication includes activation of the LED of the indicator module 150 to emit light constantly. If it is determined that the button of the input module 130 is pressed not longer than the predetermined time period, the control module 114 controls the access point 100 to enter a slave mode, and the indicator module 150 produces a second indication for indicating that the access point 100 has entered the slave mode. In the exemplary embodiment, the second indication includes flashing of the LED of the indicator module 150. The frequency of flashing can for example be once per second. In other embodiments, the frequency of flashing may be varied according to different requirements.

The transceiver module 116 transmits and receives the frames 1000 for establishing the WDS link. The control module 114 is further used for controlling the transmission and receipt of the frames 1000 by the transceiver module 116. In the exemplary embodiment, if the access point 100 enters a master mode, the transceiver module 116 transmits a broadcast frame and an ACK frame. If the access point 100 enters a slave mode, the transceiver module 116 scans a broadcast frame transmitted by a master access point, and transmits a request frame to the master access point. In the exemplary embodiment, the transceiver module 116 scans the broadcast frame by a passive scan. That is, the transceiver module 116 receives the broadcast frame, and selects an optimal master access point according to the broadcast frame.

In other embodiments, the transceiver module 116 may transmit a query frame to the master access point. The master access point transmits the broadcast frame to the access point 100 after receiving the query frame. Then the transceiver module 116 receives the broadcast frame, and selects an optimal master access point according to the broadcast frame.

The transceiver module 116 transmits a request frame to the optimal master access point to make a request for establishing a WDS link after selecting the optimal master access point. In the exemplary embodiment, if the optimal master access point accepts the request, the optimal master access point transmits an ACK frame to the access point 100. If the optimal master access point does not accept the request, the optimal master access point does not transmit the ACK frame. Therefore, if the transceiver module 116 receives the ACK frame from the optimal master access point, a WDS link between the access point 100 and the optimal master access point is successfully established. If the transceiver module 116 does not receive the ACK frame from the optimal master access point, the WDS link is not established.

If the access point 100 enters the master mode and successfully establishes a WDS link, the indicator module 150 produces a third indication. In the exemplary embodiment, the third indication includes the LED of the indicator module 150 being turned off. If the access point 100 enters the slave mode and successfully establishes a WDS link, the indicator module 150 produces a fourth indication. In this embodiment, the fourth indication includes the LED of the indicator module 150 quickly flashing for a predetermined time period and then being turned off. The frequency of flashing can for example be 6 times per second. In other embodiments, the frequency of flashing may be varied according to different requirements.

If the access point 100 enters the slave mode but has not successfully established a WDS link after a predetermined time period has passed, then the access point 100 turns off. In the exemplary embodiment, the predetermined time period can be 3 minutes.

In the exemplary embodiment, all of the access points 100, 200 and 300 have the functional modules shown in FIG. 3. Accordingly, the access points 200 and 300 can each establish WDS links with the access point 100 and with each other.

Figure 4:
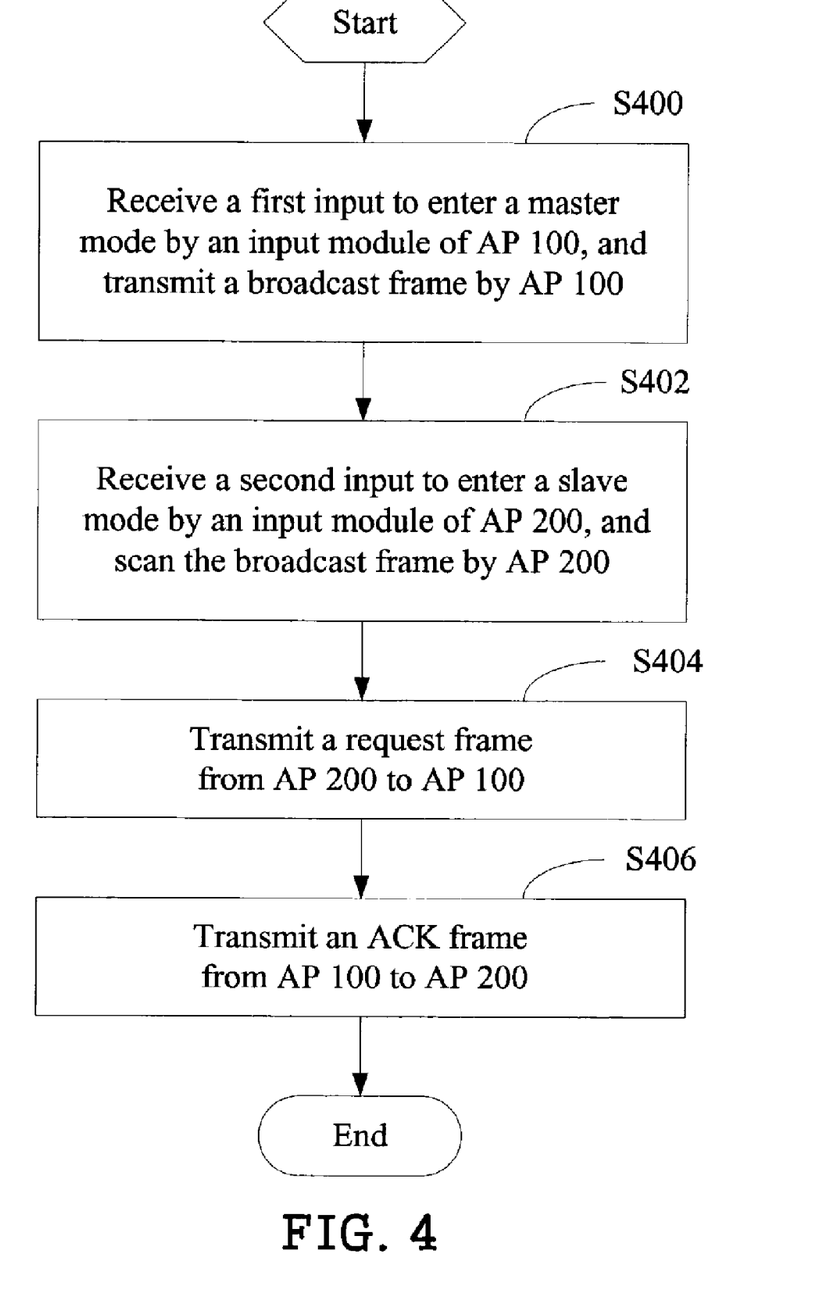
FIG. 4 is a flowchart of a method for establishing a wireless distribution system (WDS) link between two access points, in accordance with another exemplary embodiment of the present invention.

FIG. 4 is a flowchart of a method for establishing a WDS link between two access points, in accordance with an exemplary embodiment of the present invention. In the exemplary embodiment, a method for establishing a WDS link between the access point 100 and the access point 200 is described as follows.

In step S400, the access point 100 receives a first input to enter a master mode by the input module 130, and transmits a broadcast frame. In step S402, the access point 200 receives a second input to enter a slave mode by an input module of the access point 200, and scans the broadcast frame transmitted by the access point 100. In the exemplary embodiment, the access points 100 and 200 differ from each other when establishing a WDS link essentially only in that one is functioning in a master mode and the other in a slave mode. In step S404, the access point 200 transmits a request frame to the access point 100 to make a request for establishing a WDS link. In step S406, the access point 100 transmits an ACK frame to the access point 200. As a result, the WDS link between the access points 100 and 200 is successfully established.

In other embodiments, the roles of the access point 100 and 200 can be reversed; that is, the access point 100 enters a slave mode and the access point 200 enters a master mode.

Figure 5:
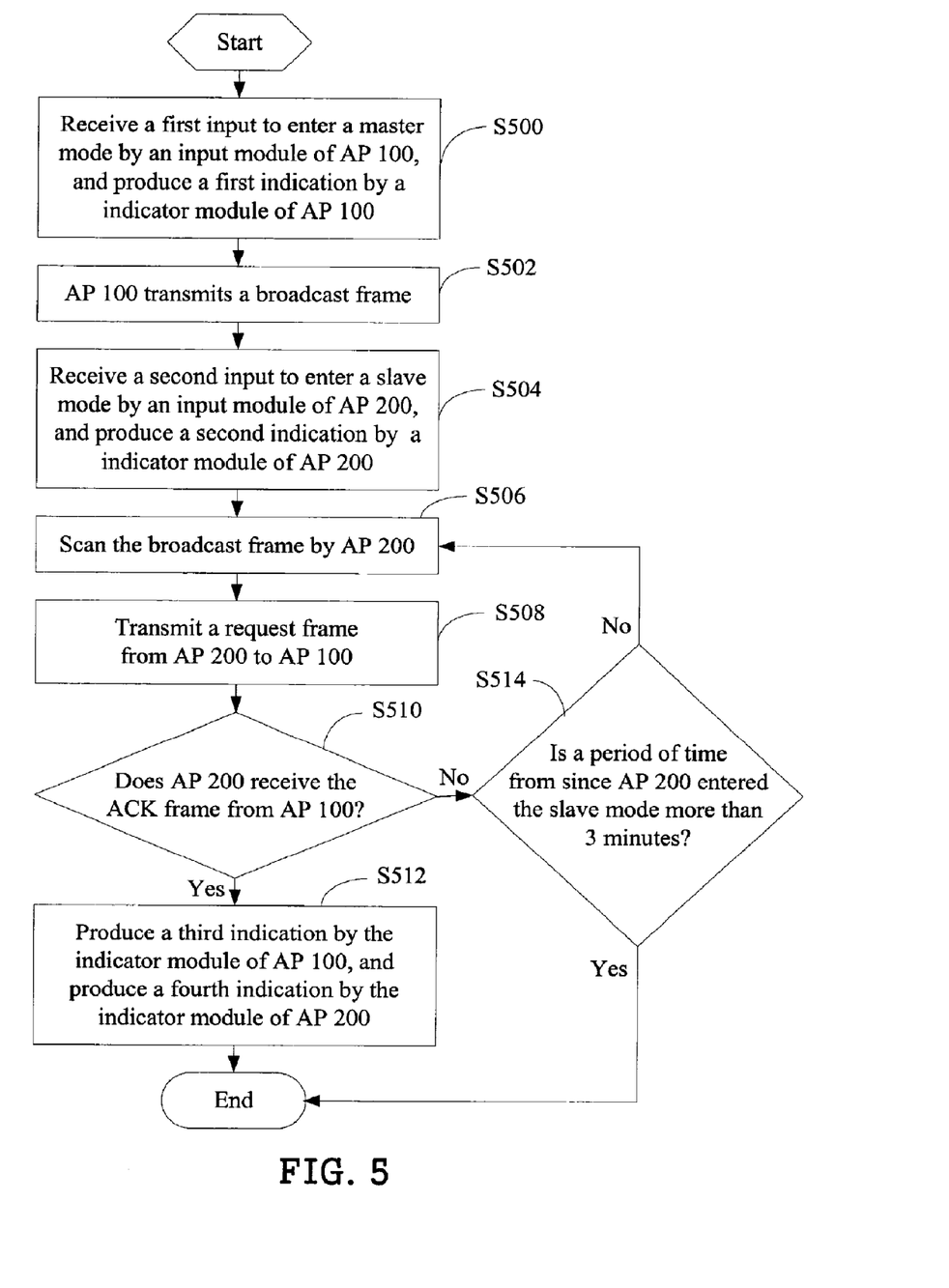
FIG. 5 is a flowchart of a method for establishing a WDS link between two access points, in accordance with still another exemplary embodiment of the present invention.

FIG. 5 is a flowchart of a method for establishing a WDS link between two access points, in accordance with another exemplary embodiment of the present invention.

In step S500, the input module 130 of the access point 100 receives a first input to enter a master mode, and the indicator module 150 of the access point 100 produces a first indication. In the exemplary embodiment, the first input indicates that the button of the input module 130 is pressed longer than a predetermined time period. The first indication includes activation of the LED of the indicator module 150 to emit light constantly.

In step S502, the access point 100 transmits a broadcast frame. In the exemplary embodiment, the broadcast frame is a data frame 1000 of the access point 100, as shown in FIG. 2. The broadcast frame includes the broadcast MSDU 1210. The broadcast MSDU 1210 includes a BSSID, a channel number, and a current WDS link number. The BSSID is a MAC address of the access point 100. The channel number is of an existing channel of the access point 100. The current WDS link number is established by the access point 100. In other embodiments, the broadcast MSDU 1210 may include more information according to different requirements.

In step S504, an input module of the access point 200 receives a second input to enter a slave mode, and an indicator module of the access point 200 produces a second indication. In the exemplary embodiment, the second input indicates that the button of the access paint 200 is pressed not longer than the predetermined time period (e.g., approximately 3 seconds). The second indication includes flashing of the LED of the indicator module of the access point 200.

In step S506, the access point 200 scans the broadcast frame transmitted by the access point 100. In the exemplary embodiment, the access point 200 scans the broadcast frame by a passive scan. That is, the access point 200 receives the broadcast frame, and selects the access point 100 according to the broadcast frame.

In other embodiments of step S506, the access point 200 may transmit a query frame to the access point 100. Then in response the access point 100 transmits the broadcast frame to the access point 200. Lastly, the access point 200 receives the broadcast frame and selects the access point 100 according to the broadcast frame.

In step S508, the access point 200 transmits a request frame to the access point 100 to make a request for establishing a WDS link. In the exemplary embodiment, the request frame is a data frame 1000 of the access point 200, as shown in FIG. 2. The request frame includes a request MSDU 1210. The request MSDU 1210 includes a BSSID and a WDS link number. The BSSID is a MAC address of the access point 200. The WDS link number is established by the access point 200. In other embodiments, the request MSDU 1210 may include more information according to different requirements.

In the exemplary embodiment, if the access point 100 accepts the request, the access point 100 transmits an ACK frame to the access point 200. In the exemplary embodiment, the ACK frame is a data frame 1000 of the access point 100, as shown in FIG. 2. The ACK frame includes an ACK MSDU 1210. If the access point 100 does not accept the request, the access point 100 does not transmit the ACK frame.

Therefore, in step S510, the access point 200 determines whether the access point 200 receives the ACK frame from the access point 100.

If the access point 200 receives the ACK frame from the access point 100, a WDS link between the access point 100 and the access point 200 is successfully established. Accordingly, in step S512, the indicator module 150 of the access point 100 produces a third indication, and the indicator module of the access point 200 produces a fourth indication. In the exemplary embodiment, the third indication includes the LED of the indicator module 150 of the access point 100 being turned off. The fourth indication includes the LED of the indicator module of the access point 200 quickly flashing for a predetermined time period and then being turned off.

If the access point 100 does not receive the ACK frame from the access point 200, the WDS link is not established. In such case, in step S514, the access point 200 determines whether a period of time from since the access point 200 entered the slave mode is more than, for example, 3 minutes. If the determination is no, then the process returns to step S506, and the access point 200 keeps scanning the broadcast frame. If the determination is yes, then the access point 200 exits the slave mode.

Figure 6:
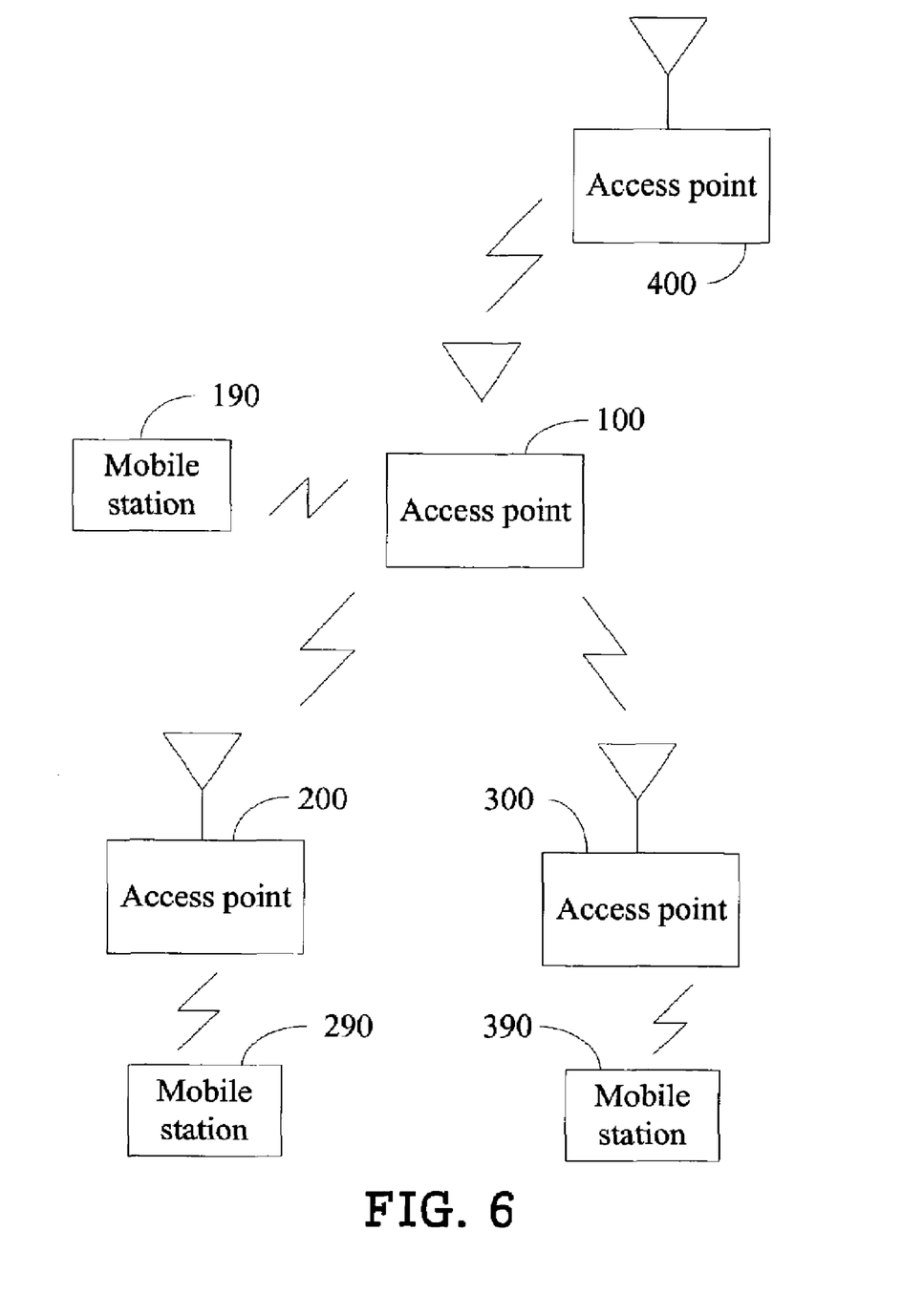
FIG. 6 is a schematic diagram of an exemplary wireless communication system including four access points, any one or more of which may be one in accordance with an exemplary embodiment of the present invention.

FIG. 6 is a schematic diagram of an exemplary wireless communication system including four access points, any one or more of which may be one in accordance with an exemplary embodiment of the present invention. FIG. 6 is similar to FIG. 1, but further includes an access point 400. In the exemplary embodiment of FIG. 6, the access point 100 and the access point 400 can establish a WDS link by employing either of the above-described methods for establishing a WDS link. Thus the scope of the wireless network is further expanded.

In any of the above-described exemplary embodiments, WDS links between two or more access points can be easily established by the pressing of one or more respective buttons, and any WDS link status can be readily recognized by a corresponding LED status.

While various embodiments including methods have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. An access point for establishing one or more wireless distribution system links with one or more other access points, comprising:

an input module comprising a button for receiving an input comprising an indication that the button is pressed longer or not longer than a predetermined time period, and initiating a wireless distribution system link according to the input; and a main module for detecting the input, determining an operating mode comprising a master mode or a slave mode according to the input comprising the indication that the button is pressed longer or not longer than the predetermined time period, and transmitting and receiving frames for establishing the wireless distribution system link according to the operating mode, wherein the frames for establishing the wireless distribution system link comprise a broadcast frame, a request frame, and an acknowledgment frame;

wherein the broadcast frame comprises a basic set identifier (BSSID), a channel number, and a current wireless distribution system link number, the BSSID of the broadcast frame is a media access control (MAC) address of the access point that transmits the broadcast frame, the channel number of the broadcast frame is an existing channel of the access point transmitting the broadcast frame, and the current wireless distribution system link number of broadcast frame is established by the access point transmitting the broadcast frame;

wherein the request frame comprises a request MAC service data unit (MSDU) comprising a BSSID and a wireless distribution system link number, the BSSID of the request frame is an MAC address from which the request frame is transmitted, and the wireless distribution system link number of the request frame is established by the access point transmitting the request frame;

wherein the acknowledge frame comprises an acknowledge MSDU having information for establishing wireless distribution system links.

2. The access point as claimed in claim 1, wherein the main module comprises a detection module for detecting the input.

3. The access paint as claimed in claim 2, wherein the main module further comprises a transceiver module for transmitting and receiving the frames for establishing the wireless distribution system link.

4. The access point as claimed in claim 3, wherein the main module further comprises a control module for determining the operating mode of the access point according to a result of detection by the detection module, and for controlling the transmission and receipt of the frames by the transceiver module.

5. The access point as claimed in claim 1, wherein the frames for establishing the wireless distribution system link further comprise a query frame including a query media access control (MAC) service data unit (MSDU) having information for establishing wireless distribution system links.

6. The access point as claimed in claim 1, wherein the main module determines a master mode when the input comprises an indication that the button is pressed longer than a predetermined time period, and determines a slave mode when the input comprises an indication that the button is pressed not longer than a predetermined time period.

7. A method for establishing a wireless distribution system (WDS) link between two access points, comprising the steps of:

providing a first input module comprising a button for a first access point;

providing a second input module comprising a button for a second access point;

receiving a first input comprising an indication that the button of the first input module of the first access point is pressed longer than a predetermined time period to enter a master mode by the first input module of the first access point, and transmitting a broadcast frame by the first access point, wherein the broadcast comprises a basic service set identifier (BSSID), a channel number, and a current WDS number, the BSSID is a media access control (MAC) address of the first access point that transmits the broadcast frame, the chanel number is an existing channel of the first access point transmitting the broadcast frame, and the current WDS link number is established by the first access point transmitting the broadcast frame;

receiving a second input comprising an indication that the button of the second input module of the second access point is pressed not longer than the predetermined time period to enter a slave mode by the second input module of the second access point, and scanning of the broadcast frame by the second access point;

transmitting a request frame from the second access point to the first access point, wherein the request frame comprises a request MAC service data unit (MSDU) comprising a BSSID and a wireless distribution system link number, the BSSID is an MAC address from which the request frame is transmitted, and the wireless distribution system link number is established by the second access point transmitting the request frame; and transmitting an acknowledgement frame from the first access point to the second access point, wherein the acknowledgement frame comprises an acknowledgement MSDU having information for establishing wireless distribution system links.

8. The method as claimed in claim 7, further comprising the steps of:

providing an indicator module for the first access point; and producing a first indication by the indicator module for indicating that the first access point has entered the master mode.

9. The method as claimed in claim 8, further comprising the steps of:

providing an indicator module for the second access point; and producing a second indication by the indicator module of the second access point for indicating that the second access point has entered the slave mode.

10. The method as claimed in claim 9, wherein each indicator module comprises a light emitting diode (LED), the first indication comprises activation of the LED of the indicator module of the first access point to emit light constantly, and the second indication comprises fleshing of the LED of the indicator module of the second access point.

11. The method as claimed in claim 7, further comprising the steps of:

transmitting a query frame from the second access point to the first access point; and transmitting the broadcast frame from the first access point to the second access point.

12. The method as claimed in claim 7, further comprising the steps of:

providing an indicator module for the first access point; and producing a first indication by the indicator module of the first access point, for indicating that the first access point has successfully established a WDS link.

13. The method as claimed in claim 12, further comprising the steps of:

providing an indicator module for the second access point; and producing a second indication by the indicator module of the second access point, for indicating that the second access point has successfully established the WDS link.

* * * * *